Patented June 9, 1925.

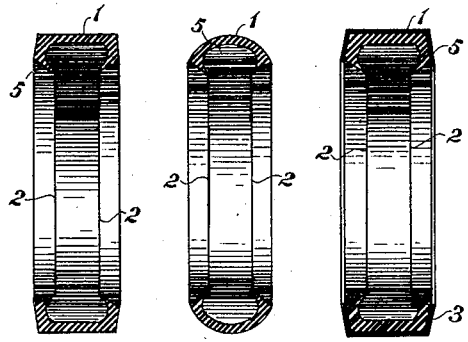
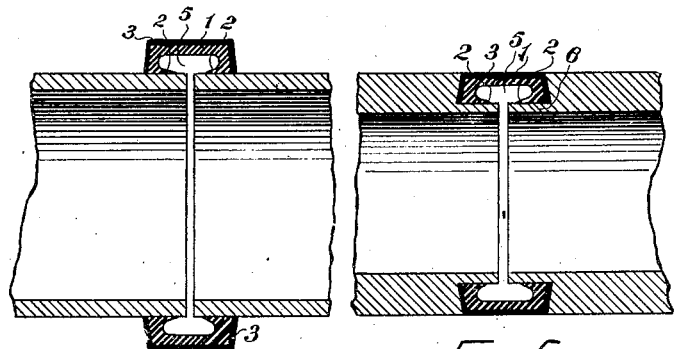
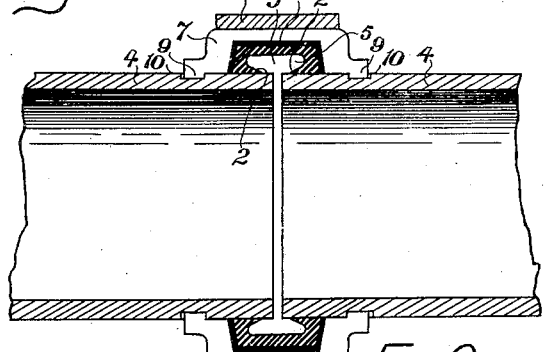

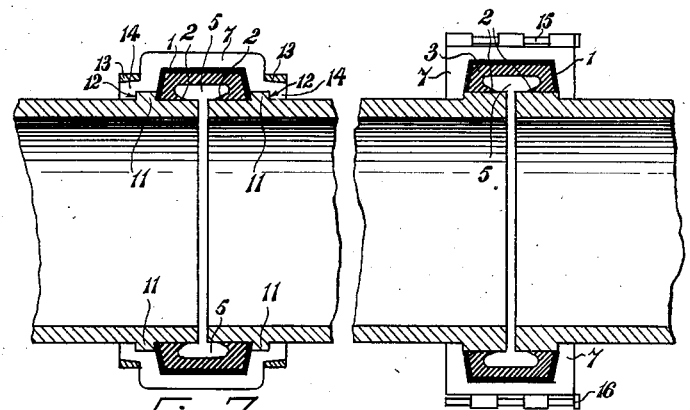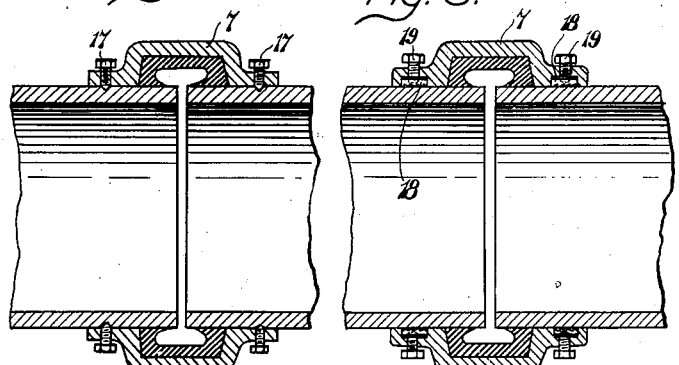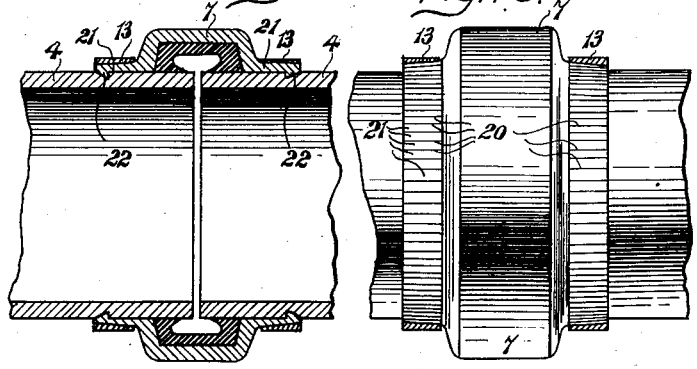

1,541,601

UNITED STATES PATENT OFFICE.

ERNEST TRIBE, OF LONDON, ENGLAND; CHARLES TRIBE, ADMINISTRATOR OF SAID ERNEST TRIBE, DECEASED, ASSIGNOR TO VICTAULIC COMPANY LIMITED, OF LONDON, ENGLAND.

PIPE JOINT.

Application filed July 7, 1919. Serial No. 309,110.

*To all whom it may concern:*

Be it known that I, ERNEST TRIBE, a subject of the King of Great Britain, and a resident of London, England, have invented certain new and useful Improvements in Pipe Joints, of which the following is a specification.

This invention relates to pipe joints, and has reference to pipe joints where internal pressure is utilized to maintain the joint leakproof. The invention has for its object to provide improved means whereby lengths of pipe can be expeditiously connected together and when so connected will remain leakproof under all pressure conditions.

An advantage of my invention of great practical importance resides in the fact that the pipes do not require the usual flanges, my invention being such that ordinary plain pipes can be arranged end to end and connected together.

The primary feature of the invention consists in the provision of a leak-preventing ring embracing the outer circumference of the pipes, this ring having flexible inturned edges and forming an annular pressure chamber bridging the junction between the opposing ends of the pipes, the pressure within the pipe operating to maintain the flexible edges of the ring in leakproof engagement with the outer circumference of the pipes. The leak-preventing ring aforesaid is, according to my invention, provided with an inextensible rim or outer periphery. This may in some cases be constituted by strengthening or rendering rigid, for instance, by vulcanization to a high degree, the outer periphery so that it is firm, but where high pressures are to be withstood I prefer to house the ring in an inextensible metal housing which may, in some cases, be moulded integral with the leak-preventing ring.

My invention also contemplates means for retaining this leak-preventing ring in position, and means for positively preventing relative longitudinal movement of one pipe relatively to another.

The invention will be more readily understood upon reference to the accompanying drawings which illustrate the invention.

In these drawings Fig. 1 illustrates in transverse section one form my leak-preventing ring may take.

Fig. 2 is a view similar to Fig. 1 showing a modified form of ring.

Fig. 3 is a similar view showing this ring housed in an inextensible housing.

Fig. 4 is a sectional view showing my leak-preventing ring in position and forming the junction between two pipes.

Fig. 5 shows a slight modification where the ends of the pipe are recessed so that the outer periphery of the ring is flush with the outer circumference of the pipes.

Fig. 6 shows a joint adapted to withstand great pressure wherein means are provided for retaining the leak-preventing ring in position and preventing relative longitudinal movement between the pipes.

Fig. 7 shows a modification of the arrangement shown in Fig. 6, and

Figs. 8, 9, 10, 11, 12, and 13 illustrate further modifications.

Figure 14:
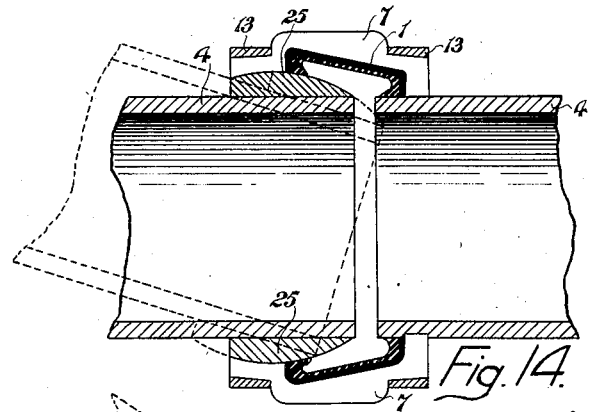
Figure 15:
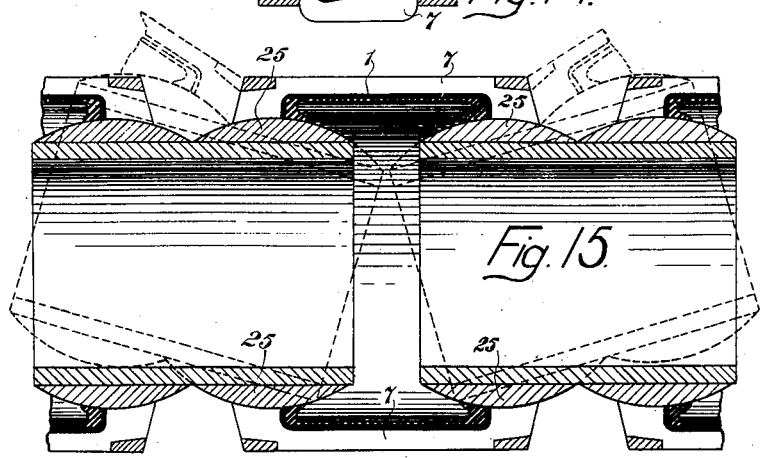

Fig. 14 shows the application of my invention designed to provide for a more or less flexible pipe line, and Fig. 15 shows an extension of the principle outlined in Fig. 14.

Referring to these drawings throughout which like numerals of reference indicate corresponding parts wherever occurring, the numeral 1 designates the leak-preventing ring having a relatively rigid outer periphery. At the ends of the ring are inwardly extending annular flanges, which are spaced apart, and said flanges are provided with flexible annular lips, which form inwardly directed extensions of said flanges, and define inwardly tapering openings to receive the ends of the pipes, said lips being frustro-conical in form and having inwardly converging inner and outer surfaces. The ring 1 is preferably provided with an inextensible housing 3 which may be of steel or other suitable material or as before indicated may in some cases be of vulcanite or other material incorporated with the ring itself during moulding. The principle involved in making the joint is clearly illustrated in Figs. 4 and 5 from which it will be seen that the ends of the pipes 4 to be joined are pushed from each side into the ring 1 so that the flexible lips 2 embrace closely the outer circumference of those parts of the pipes to which the ring is applied. In order to ensure close engagement of the flexible lips 2 of the ring 1 with the ends of the pipes, the inner diameter of the ring before the ends of the pipes are inserted is slightly less than the outside diameters of the pipes. Thus when the ends of the pipes are inserted into the ring, the flexible lips 2 embrace the pipes tightly and are forced inwards and adopt the positions indicated in the drawings.

The annular recess 5 in the ring 1 forms a pressure chamber bridging the junction between the opposing ends of the two pipes, and it will be seen that as the pressure in the pipe line rises, the contact of the flexible lips 2 with the pipes 4 is more closely made and leakage is automatically provided against.

In some cases the leak-preventing ring with its housing or casing of rigid material alone may be used for it will be found that quite a substantial connection between the pipes can be made in this way, and where it is desired to provide a pipe line of the same diameter throughout, the ends of the pipes can be recessed as indicated at 6 in Fig. 5. Such an arrangement would be quite satisfactory for pipes embedded in concrete or the like, for instance.

Where great security is desired, I propose, however, to provide a retaining device for maintaining the ring 1 in position. One form of retaining ring 7 is shown in Fig. 6 and consists of two half rings having an annular recess to accommodate the leak-preventing ring 1. The outer periphery of the retaining ring 7 formed by the two half rings is preferably tapered, and the whole is locked in position by an outer steel or like band 8 which is driven on to the taper as clearly illustrated in Fig. 6. In order to prevent any longitudinal movement of one pipe relative to its adjoining one, the retaining ring 7 may be provided with flanges 9 adapted to engage in grooves 10 in the ends of the pipes, or alternatively small flanges 11 on the pipes may register with grooves 12 in the ring 7 as indicated in Fig. 7, which also illustrates how in place of the central locking ring or band 8 a pair of rings or bands 13 may be applied to tapered end flanges 14 of the retaining ring 7.

Fig. 8 illustrates how the half rings forming the retaining ring 7 may be hinged together by a hinge pin 15 and locked by a locking pin 16 adapted to pass through eye members carried by the parts of the ring 7 as will be readily understood. Fig. 9 shows how an undivided retaining ring 7 may be employed, the ends of the pipes being pushed into position from each side and the retaining ring 7 then locked in position by grub screws 17.

A modification of this arrangement is shown in Fig. 10 wherein a number of serrated segments 18 are located in recesses in the ring 7 and locked in position by set screws 19.

Figs. 11 and 12 show an alternative method of preventing relative longitudinal movement between the two pipes. According to this arrangement the retaining ring 7 is provided with saw cuts 20 which form in effect a number of spring catches 21 whose noses 22 snap into grooves in the pipes 4 when the latter are pushed into correct position, the whole being locked securely by the locking rings or bands 13. Another method which might be adopted is to provide pins on the pipes adapted to engage angular slots in the flanges of an undivided retaining ring after the fashion of a bayonet joint.

Figure 13:
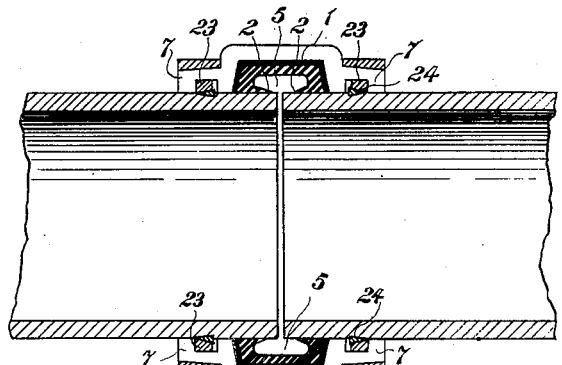

A still further method is illustrated in Fig. 13. This is much the same as that illustrated in Fig. 7 except that instead of flanges 11 on the pipes 4 loose rings 23 may be provided and locked in position by split wedge rings 24 adapted to register in grooves in the pipes, or the rings 23 may each be in one piece split so as to be capable of being sprung over the pipes and into shallow grooves suitably located in the periphery of the pipes.

Fig. 14 shows how one pipe may be connected to another with facility for angular movement within limits. In this case one of the pipes 4 is provided with a ball end 25 and the two halves of the retaining ring 7 and the leak-preventing ring 1 are made to conform to the curvature of this ball end. Thus the pipe having the ball end can be turned relatively to the other pipe as indicated by dotted lines in Fig. 14.

The method I propose to employ where a flexible pipe line is required is illustrated in Fig. 15. In this case each length of pipe is provided with a pair of ball ends 25 and the two halves of the retaining ring 7 with the leak-preventing ring 1 in position conform to these ball ends, and it will be seen that very considerable angular movement can be provided for without sacrificing in any way the benefits derived from my invention since it will be quite clear that the principle of obtaining leak proof joints is precisely similar in all the examples illustrated. In this connection it should be mentioned that the various examples hereinbefore specifically described and illustrated in the drawings are given by way of example only and do not exhaust the possible methods which may be adopted within the scope of my claims.

Having now particularly described and ascertained the nature of my said invention and in what manner the same is to be performed, I declare that what I claim is:—

1. A ring for forming a leak-preventing joint between the adjacent ends of two pipes, said ring comprising as a unitary structure a flexible body portion and flexible annular flanges extending inwardly from the edges of the body portion and forming with the body portion a reentrant fluid-receiving recess, said flanges having pipe-engaging walls projecting diagonally inwards toward the axis of the ring to form tapering pipe-receiving openings the smaller portions of which openings are of smaller diameters than the diameters of the outer surfaces of the pipes to be received by them, and said flexible body portion forming a yielding backing for urging said flanges into sealing engagement with the outer surfaces of the pipes engaged by them.

2. The combination with two pipes having their ends arranged adjacent to each other, of a leak-preventing joint between the adjacent ends of said pipes and including a ring surrounding the pipes, said ring comprising as a unitary structure a flexible body portion and flexible annular flanges extending inwardly from the edges of the body portion and bearing upon the outer surfaces of said pipe ends, said flanges forming with said body portion a reentrant recess for receiving fluid from said pipes, said flanges before the ring is applied to the pipes having pipe-engaging walls projecting diagonally inwards toward the axis of the ring to form tapering pipe-receiving openings the smaller portions of which openings are of smaller diameters than the diameters of the outer surfaces of said pipes upon which the flanges bear, said flexible body portion forming a yielding backing for urging said flanges into sealing engagement with the outer surfaces of said pipe ends, and a rigid housing encasing the body portion of the ring.

3. The combination with two pipes having their ends arranged adjacent to each other, of a leak-preventing joint between the adjacent ends of said pipes and including a ring surrounding the pipes, said ring comprising as a unitary structure a flexible body portion and flexible annular flanges extending inwardly from the edges of the body portion and bearing upon the outer surfaces of said pipe ends, said flanges forming with said body portion a reentrant recess for receiving fluid from said pipes, said flanges before the ring is applied to the pipes having pipe-engaging walls projecting diagonally inwards toward the axis of the ring to form tapering pipe-receiving openings the smaller portions of which openings are of smaller diameters than the diameters of the outer surfaces of said pipes upon which the flanges bear, said flexible body portion forming a yielding backing for urging said flanges into sealing engagement with the outer surfaces of said pipe ends, and a multiple part housing encasing the body portion of the ring, said pipes and housing being provided with interengaging flanges and grooves for locking the pipes against substantial longitudinal movement with relation to each other.

4. The combination with two pipes having their ends arranged adjacent to each other, of a leak-preventing joint between the adjacent ends of said pipes and including a ring surrounding the pipes, said ring comprising as a unitary structure a flexible body portion and flexible annular flanges extending inwardly from the edges of the body portion and bearing upon the outer surfaces of said pipe ends, said flanges forming with said body portion a reentrant recess for receiving fluid from said pipes, said flanges before the ring is applied to the pipes having pipe-engaging walls projecting diagonally inwards toward the axis of the ring to form tapering pipe-receiving openings the smaller portions of which openings are of smaller diameters than the diameters of the outer surfaces of said pipes upon which the flanges bear, said flexible body portion forming a yielding backing for urging said flanges into sealing engagement with the outer surfaces of said pipe ends, a multiple-part housing encasing the body portion of the ring, and means engaging the parts of said housing for drawing them together upon said ring and for clamping them upon the ring.

5. The combination with two pipes having their ends arranged adjacent to each other, of a leak-preventing joint between the adjacent ends of said pipes and including a ring surrounding the pipes, said ring comprising as a unitary structure a flexible body portion and flexible annular flanges extending inwardly from the edges of the body portion and bearing upon the outer surfaces of said pipe ends, said flanges forming with said body portion a reentrant recess for receiving fluid from said pipes, said flanges before the ring is applied to the pipes having pipe-engaging walls projecting diagonally inwards towards the axis of the ring to form tapering pipe-receiving openings the smaller portions of which openings are of smaller diameters than the diameters of the outer surfaces of said pipes upon which the flanges bear, said flexible body portion forming a yielding backing for urging said flanges into sealing engagement with the outer surfaces of said pipe ends, a multiple-part housing encasing the body portion of the ring, said pipes and housing being provided with interengaging flanges and grooves for locking the pipes against substantial longitudinal movement with relation to each other, and means engaging the parts of said housing for drawing them together upon said ring and for clamping them upon the ring.

6. A pipe joint comprising a leak-preventing ring whose outer periphery is sufficiently rigid to insure the ring as a whole maintaining substantially circular formation, flanges proceeding inwardly from the ends of said ring, said flanges tapering to flexible lips of diameter less than the diameter of the pipes to be joined and forming countersunk openings through which the pipes can be inserted and forced into engagement with the flexible lips whereby said flexible lips engage the pipes with tension and maintain a tight joint and prevent leakage, and flanges on said pipes engaging grooves in a longitudinally divided retaining ring.

7. A pipe joint comprising a leak-preventing ring whose outer periphery is sufficiently rigid to insure the ring as a whole maintaining substantially circular formation, flanges proceeding inwardly from the ends of said ring, said flanges terminating in frustro-conical lips defining openings of less diameter than the diameter of the pipes to be joined and forming constricted openings through which plain ended pipes can be inserted and forced into engagement with the flexible edges whereby said flexible lips engage the pipes with tension and maintain a tight joint and prevent leakage, a retaining ring consisting of a longitudinally divided ring, and a binding ring for maintaining said longitudinally divided ring in position.

8. A pipe joint comprising a ring having a relatively rigid outer periphery, inwardly extending annular flanges, spaced apart, and flexible annular lips, forming inwardly directed extensions of said flanges and defining inwardly tapering openings, the pipes having their ends arranged in said openings and gripped by said lips, and a retaining ring forming a housing for the first named ring and comprising a longitudinally divided ring held in position by a binding ring.

9. A pipe joint comprising a ring having a relatively rigid outer periphery, inwardly extending annular flanges, spaced apart, and flexible annular lips forming inwardly directed extensions of said flanges and defining inwardly tapered openings, the pipes having their ends arranged in said openings and gripped by said lips, and a retaining ring forming a housing for the first named ring, and comprising a longitudinally divided ring held in position by a binding ring, said retaining ring having flange and groove engagement with the pipes to prevent detrimental displacement of the pipes relative to each other.

In witness whereof I affix my signature.

ERNEST TRIBE.